US007881978B2

(12) United States Patent
Baptiste

(10) Patent No.: US 7,881,978 B2
(45) Date of Patent: Feb. 1, 2011

(54) METHOD, MEDIUM, AND SYSTEM FOR PROVIDING QUOTES

(75) Inventor: Ryan E. Baptiste, Shamong, NJ (US)

(73) Assignee: Ryero Corporation, Powells Point, NC (US)

( * ) Notice: Subject to any disclaimer, the term of this patent is extended or adjusted under 35 U.S.C. 154(b) by 701 days.

(21) Appl. No.: 11/985,498

(22) Filed: Nov. 15, 2007

(65) Prior Publication Data

US 2009/0132270 A1 May 21, 2009

(51) Int. Cl.
*G06Q 30/00* (2006.01)
(52) U.S. Cl. ........................................ 705/26
(58) Field of Classification Search .................. 705/26, 705/27
See application file for complete search history.

(56) References Cited

U.S. PATENT DOCUMENTS

| | | | | |
|---|---|---|---|---|
| 5,758,328 | A * | 5/1998 | Giovannoli | 705/26 |
| 5,842,178 | A | 11/1998 | Giovannoli | |
| 6,338,050 | B1 * | 1/2002 | Conklin et al. | 705/80 |
| 6,345,258 | B1 | 2/2002 | Pickens | |
| 6,868,386 | B1 | 3/2005 | Henderson et al. | |
| 7,069,308 | B2 | 6/2006 | Abrams | |
| 7,124,088 | B2 | 10/2006 | Bauer et al. | |
| 7,136,830 | B1 * | 11/2006 | Kuelbs et al. | 705/27 |
| 7,167,835 | B2 | 1/2007 | Coomber et al. | |
| 7,249,085 | B1 | 7/2007 | Kinney, Jr. et al. | |
| 7,254,553 | B2 | 8/2007 | Fogelson | |
| 7,330,826 | B1 * | 2/2008 | Porat et al. | 705/26 |
| 7,440,911 | B1 * | 10/2008 | Fors et al. | 705/26 |
| 7,620,575 | B1 * | 11/2009 | Tenorio | 705/35 |
| 2001/0032170 | A1 * | 10/2001 | Sheth | 705/37 |
| 2001/0034631 | A1 * | 10/2001 | Kiselik | 705/8 |
| 2001/0049634 | A1 * | 12/2001 | Stewart | 705/26 |
| 2002/0046147 | A1 * | 4/2002 | Livesay et al. | 705/37 |
| 2003/0212604 | A1 * | 11/2003 | Cullen, III | 705/26 |
| 2006/0074780 | A1 * | 4/2006 | Taylor et al. | 705/35 |
| 2006/0085259 | A1 | 4/2006 | Nicholas et al. | |
| 2007/0073607 | A1 * | 3/2007 | Eydelman | 705/37 |
| 2007/0239567 | A1 * | 10/2007 | Fogelson | 705/27 |
| 2008/0162305 | A1 * | 7/2008 | Rousso et al. | 705/27 |

OTHER PUBLICATIONS http://www.teleorg.org/e-commerce/studies/B2Bemarketplaces.doc.*
e-counters.com Countertops Made Easy, Countertop Installation with e-counters.com, http://www.e-counters.com/eKitchen/eHow-Works.cfm.

* cited by examiner

*Primary Examiner*—Yogesh C Garg
*Assistant Examiner*—Matthew Zimmerman
(74) *Attorney, Agent, or Firm*—Brooks, Cameron & Huebsch, PLLC

(57) ABSTRACT

Methods, computer executable program instructions, and systems including program instructions are provided for use with quotes. A method embodiment includes providing a website that receives a request for quotes (RFQ) from a buyer-business. The method also includes providing control to a seller-business via the website to authorize the buyer-business to receive quotes on behalf of the seller-business. The method further includes charging a fee to the seller-businesses for quotes delivered to the buyer-business on behalf of the seller-businesses.

20 Claims, 11 Drawing Sheets

METHOD, MEDIUM, AND SYSTEM FOR PROVIDING QUOTES

BACKGROUND

In the field of electronic commerce, businesses and individuals can purchase and sell products using various electronic media, such as the Internet. Businesses use electronic media to sell some products to individual purchasers and to other businesses. Electronic media are useful for providing product information about products for sale. For example, a potential purchaser can often obtain product information from an Internet website of a business selling the product.

However, some business-to-business markets are characterized by seller-businesses that may not advertise prices on the Internet or elsewhere. Such markets may operate with more traditional methods that may include the use of salespeople and/or requests for quotes (RFQs) from a buyer-business to one or more seller-businesses before a product price is revealed to a purchaser. Transactions in such markets can involve products that come with various options, are made-to-order, are processed primarily upon receipt of an order, or involve some degree of service with the product, etc. In such markets, seller-businesses that utilize salespeople may compensate a salesperson with a wage, salary, and/or commission.

Also, the buyer-business in such a market may desire to receive a number of quotes form a number of different seller-businesses. The buyer-business may then have to deal with one or more salespeople from the number of different seller-businesses. Furthermore, the buyer-business may have to create an RFQ for each seller-business from whom the buyer-business desires to receive a quote. In some instances, mistakes in processing an RFQ received from a buyer-business may occur by a seller-business when the RFQ is in a form unfamiliar to the seller-business, or when the RFQ contains uncertain terms, for example.

Some seller-businesses, or third parties, in such markets may maintain a website allowing buyer-businesses to make an RFQ online. However, such websites may not allow a buyer-business to price-shop the competition without having to create more than one RFQ for more than one seller-business and/or visit more than one website for more than one seller-business.

DETAILED DESCRIPTION

Embodiments of the present disclosure include methods, computer executable instructions (e.g., software/program instructions), and website platform systems including program instructions for use with a quote system. A method embodiment includes providing a website that receives a request for quotes (RFQ) from a buyer-business. The method also includes providing control to a seller-business via one or more interfaces to the website through which the seller-business can authorize the buyer-business to receive quotes on behalf of the seller-business. The method further includes charging a fee to the seller-businesses for quotes delivered to the buyer-business on behalf of the seller-businesses.

Embodiments of the present disclosure can be performed by software, firmware, hardware, application modules, and the like. These embodiments can use program instructions resident on memory resources and executable by processor resources and/or logic executed by ASICs, devices, systems, or networks shown herein or otherwise. The embodiments of the present disclosure are not limited to any particular operating environment or to instructions written in any particular programming language and/or logic according to a particular hardware, e.g., ASIC, architecture. Software, firmware, logic, and/or processing modules, suitable for carrying out embodiments of the present disclosure, can be resident on one or more devices or in one or more locations.

Although some embodiments of the present disclosure are described with respect to quotes in a market including stone slab sellers, finishers, resellers, kitchen dealers, and/or contractors, embodiments are not so limited. Aspects of the present disclosure can be used for quotes in a variety of markets including but not limited to windows, doors, cabinets, flooring, siding, lighting, roofing, machinery, and/or other consumer products and services, etc. Furthermore, embodiments are not limited to home or office improvement markets. Quotes according the present disclosure can be used in any market that operates with the use of RFQs.

Figure 1:
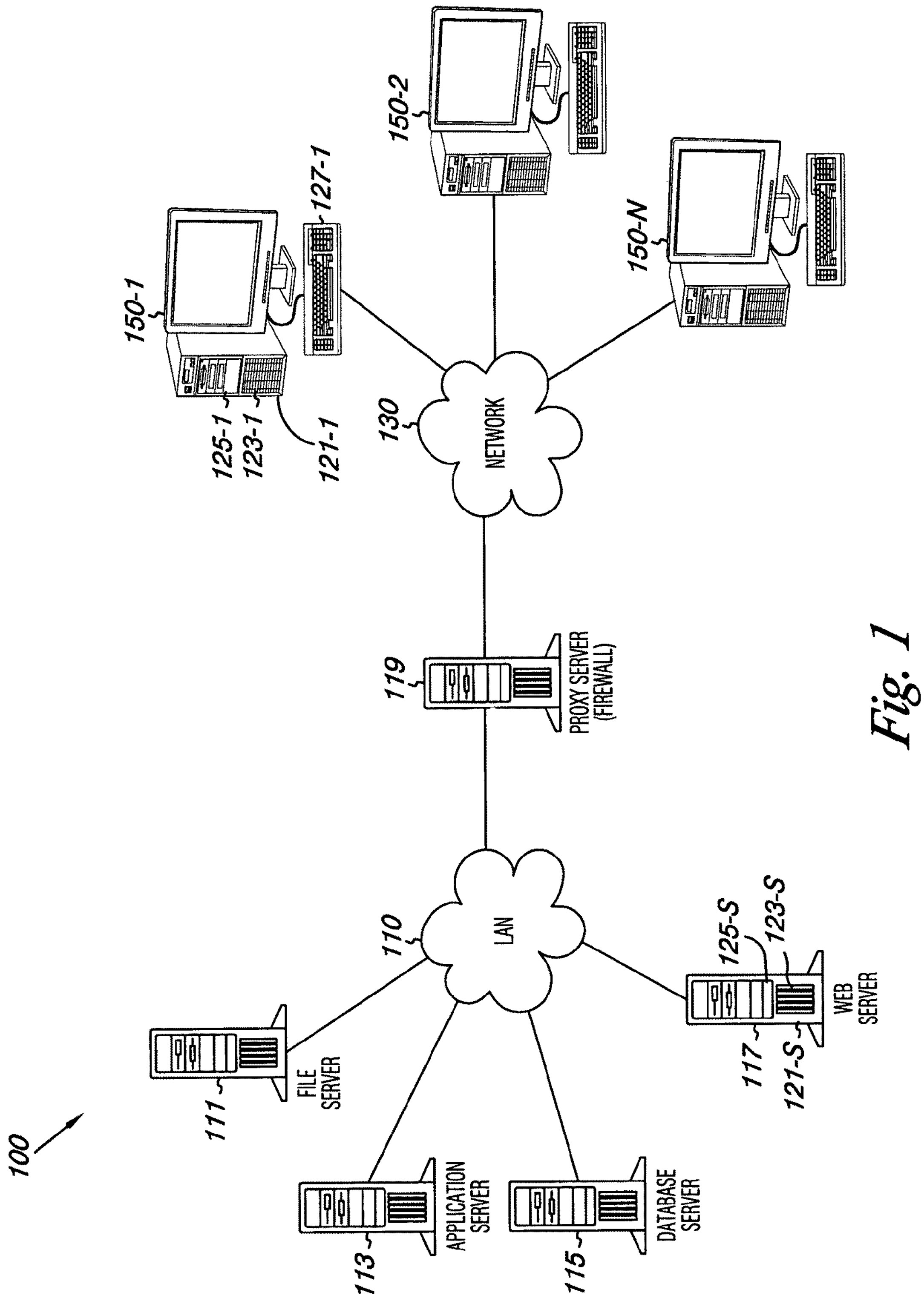
FIG. 1 illustrates an exemplary computing network suitable for implementing embodiments of the present disclosure.

FIG. 1 illustrates an exemplary computing network 100 suitable for implementing embodiments of the present disclosure. A number of network devices, e.g. personal computers, servers, computing peripherals, etc., can be networked together via a local area network (LAN) 110 and additional networks 130, e.g., additional local and wide area networks (LANs/WANs), including wireless networks having mobile wireless access points, RF receivers/transceivers, the Internet, etc. Embodiments are not limited to the manner in which network devices can be connected together via a myriad of technologies and protocols associated with various kinds of networks. FIG. 1 illustrates one embodiment for a number of servers, e.g., 111, 113, 115, 117, and 119, networked together through the LAN 110.

The servers connected together through the LAN 110 include a file server 111, an application server 113, a database server 115, a website server 117, and a proxy server 119. As one or ordinary skill in the art will appreciate, a LAN can also include various other server types. By way of example and not by way of limitation, the file server 111 can store various files and can provide access to those files through the LAN 110. The application server 113 can store various program applications with various computer executable instructions, e.g., program instructions, which can be executable over the LAN 110 and additional networks 130, etc.

The database server 115 can store various information, e.g., data, partitioned in one or more databases and can provide access to those databases through the LAN 110 and additional networks 130, e.g., including Internet connectivity, etc. For example, the database server 115 can store one or more databases with product price and availability information, e.g., in a number of price lists, for a number of products from a number of seller-businesses. The product information can include information about products offered by a seller-business, such as product names, descriptions, quantities, pictures, prices, availability, etc. The database server 115 can be maintained such that control is provided to a seller-business, e.g., via one or more interfaces to a website associated with website server 117 as described below, for adjusting product information stored for the seller-business. The database server 115 is maintained, e.g., can be partitioned, such that one or more particular seller-businesses are restricted from accessing information stored in the database server 115 for other seller-businesses. The database server 115 is maintained such that a buyer-business is restricted from access to product information, except when certain product information is provided to a buyer-business in the form of a quote, e.g., via one or more interfaces to a website associated with website server 117, as will be described below.

As used herein, one or more interfaces to a website includes a number of website pages hosted on one or more website servers, e.g., website server 117, accessible externally via the networks 130, internally via the LAN 110, e.g., including wired and/or wireless Internet/Intranet connectivity to the world wide web (WWW), etc. A web page can be displayed on an output device, e.g., a monitor, associated with a computing device, e.g., computing device 150-1. A web page can be a graphical representation of computer executable instructions, e.g., hypertext markup language (HTML), accessible via a protocol, e.g., hypertext transfer protocol (HTTP), or variant thereof, using a web browser on a computing device, for example. Using a transfer protocol, information can flow from a web server, e.g., web server 117, to a computing device, e.g., computing device 150-1, and be displayed in a meaningful fashion to a user, e.g., a seller-business, buyer-business, etc., of the computing device.

As used herein, an interface, such as a command line interface (CLI), text, or graphical user interface (GUI), can allow a user, e.g., a seller-business, buyer-business, etc., to interact with a website via input and output components of a computing device, e.g., computing device 150-1. In one or more embodiments, such an interface can be provided to a user's computing device via computer executable instructions executed on a server, e.g., web server 117, to transmit information to a computing device where further computer executable instructions can be executed to display the information. In one or more embodiments, a user can interact with an interface using input devices such as a mouse, keyboard, or other input device as will be understood by one of ordinary skill in the art. Although a web page can provide, for example, multiple text entry fields, i.e., interfaces, on a single web page, the singular "interface" will be used herein to describe the collection of interfaces, fields, etc., associated with a single web page or on a number of web pages associated with one or more websites. For example, a web page associated with a commercial website for selling consumer goods may have a number of text entry fields, i.e., interfaces, on one or more web pages for a customer to enter, product selection, additional instructions, shipping information including street address, city, state, and zip code, etc. The collection of those multiple entry fields, interfaces are on occasion referred to herein in the singular as an "interface".

The web server 117 can provide various services associated with hosting one or more websites have one or web pages, e.g., displayable interfaces, accessible via the Internet, e.g., via the world wide web (www). For example, the web server 117 can provide a website having one or more web pages, e.g., displayable interfaces, for facilitating business-to-business quotes, e.g., for stone slab products, according to one or more embodiments described herein. The web server 117 can also store one or more web pages having product price and availability information for a number of products. The web server 117 can provide a website that is associated with, and accesses information from database server 115 via LAN 110, for example. According to one or more embodiments, the web server 117 can provide a quote to a buyer-business via the website, using price and availability information stored in the database 115. The proxy server 119 can connect the LAN 110 to the network 130 and can serve as a firewall between them. One or more of the various servers 111, 113, 115, 117, 119 can be owned and/or leased by a website provider implementing a quote system according to one or more embodiments of the present disclosure.

A number of computing devices can also connect to the Network 130. FIG. 1 shows computing devices 150-1, 150-2, . . . , 150-N. The designator "N" is intended to represent that a number of computing devices can be connected to the Internet. Computing devices can connect to the Network 130 in various ways, such as through dial-up connections, cable lines, DSL lines, using wireless protocols to connect with mobile access points, through other networks, etc. Computing devices can access various information such as information contained in one or more web pages associated with a website, through the Internet, based upon various user rights, account levels, authorization, etc., as the same will be described in more detail below. According to various embodiments, buyer-businesses can use computing devices to make a request for quotes (RFQ) and/or receive a quote. According to one or more embodiments, seller-businesses can use computing devices, e.g., computing device 150-1, to grant or deny authorization to receive quotes on behalf of the seller-businesses to a particular buyer-business.

For example, a first computing device 150-1 can be used by a seller-business while a second computing device 150-2 can be used by a buyer-business. Embodiments, however, are not so limited to the network access example shown in FIG. 1. That is, the first computing device 150-1 can be used by a seller-business from within the LAN 110. According to some embodiments, a communications link can be provided between interfaces on computing devices, e.g., computing devices 150-1 and 150-2. Such a communication link can be used, for example, by a buyer-business and seller-business for facilitating acceptance of a quote. A communication link can include email, text messaging, instant messaging, voice-over-IP, and video conferencing, among others. Various communication links can be provided by program instructions executed on application server 113, on computing devices 150-1 and 150-2, on another device, or on a combination of devices across one or more networks. For example, a buyer-business can send an email message from computing device 150-2, through an interface displayed on a computing device via a website provided by web server 117, using program instructions executed by application server 113, to a seller-business on computing device 150-1 to accept the terms of a quote provided for the seller-business via the website. Embodiments are not so limited to these examples.

One or more of the various servers 111, 113, 115, 117, 119 and/or computing devices 150-1, 150-2, . . . , 150-N can include a number of application specific integrated circuits (ASICs), e.g., ASICs 121-1 and 121-S in FIG. 1, one or more processors, e.g. processors 123-1 and 123-S in FIG. 1, one or more memories, e.g., memories 125-1 and 125-S in FIG. 1, one or more system clocks, one or more input devices, e.g., keyboard 127-1, one or more output devices, and program instructions storable in memory and executable by the processor. As the reader will appreciate, input and/or output devices can include a mouse, touch screen, voice recognition, radio frequency (RF) capabilities, etc. Such components can be connected together via physical hardware, e.g., a system bus, wireless interfaces, e.g., network interface cards (NICs), etc. One of ordinary skill in the art will appreciate the quantity, variety, and types of such components. Such detail is omitted from FIG. 1 so as not to obscure embodiments of this disclosure.

In one or more embodiments, functionality of a first website can be linked to a second website. For example, functionality provided by web server 117 can be linked to a different web server (not shown) through the network 130. Linking functionality can include transmitting and receiving information between different web servers that provide different websites. Linking functionality can also include transmitting information input by a user to an interface provided on a first web page by a first web server to a second server, e.g., a second web server. Computer executable instructions to provide one or more applications on linked websites can be executed by servers associated with either linked website, or on servers associated with both linked websites. For example, applications provided by computer executable instructions executed on a first server associated with a first website can access information stored on a second server associated with a second website, based upon appropriate user rights, account levels, authorization, etc.

Figure 2:
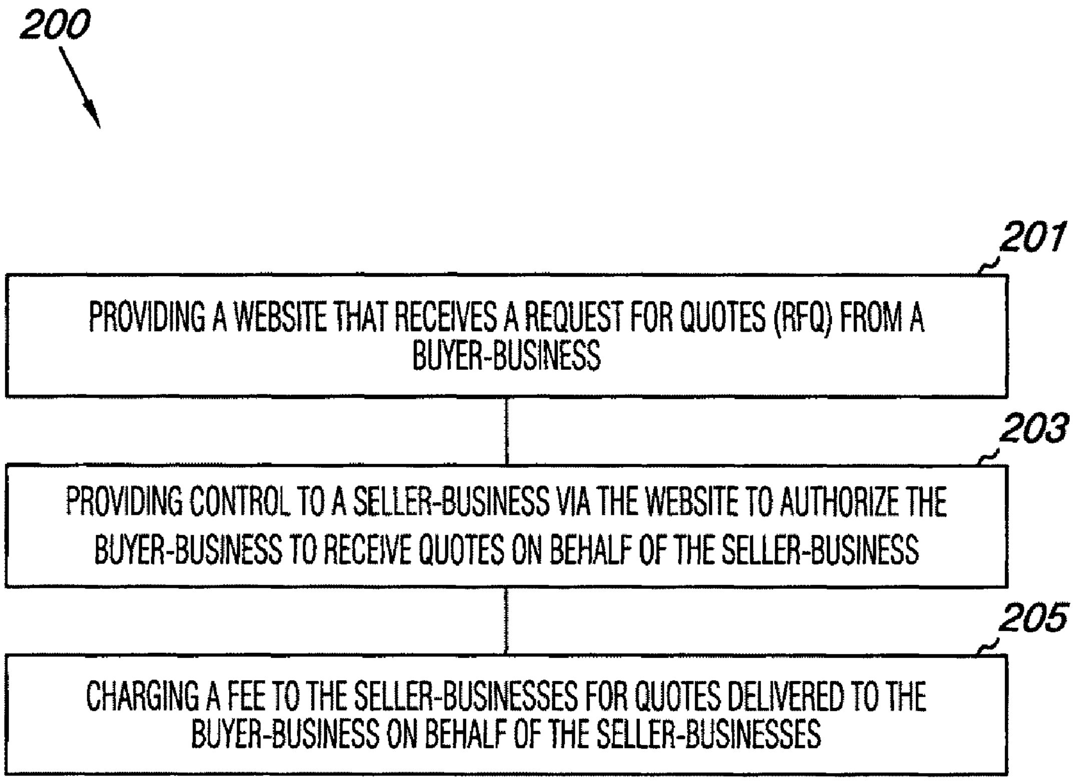
FIG. 2 is a block diagram illustrating a method for a quote system according to one or more embodiments of the present disclosure.

FIG. 2 is a block diagram illustrating a method for a quote system according to one or more embodiments of the present disclosure. As the reader will appreciate, the methods described herein can be performed by computer executable instructions, e.g., program instructions, executing on one or more processors, and/or performed by logic, e.g., ASICs, on one or more computing devices, servers, etc., across one or more networks, as the same have been illustrated in FIG. 1.

Unless explicitly stated, the method embodiments described herein may not be constrained to a particular order or sequence. Additionally, some of the described method embodiments can occur or be performed at the same point in time.

At 201, a website is provided that can receive a request for quotes (RFQ) from a buyer-business. Program instructions can execute on a server, e.g., a web server, to provide an interface to a user of a computing device, e.g., a buyer-business, on a webpage. The buyer-business can create and send an RFQ via the website interface, as is described in more detail below in connection with FIGS. 6A and 6B.

As shown at block 203, the method of FIG. 2 includes providing control to a seller-business via the website to authorize the buyer-business to receive quotes on behalf of the seller-business. Program instructions can execute on a server, e.g., a web server, an application server, etc. (such as shown in FIG. 1), to provide an interface to a user of a computing device, e.g., a seller-business, on a webpage. According to one or more embodiments, the seller-business can selectively approve or deny authorization to a buyer-business to receive quotes on behalf of the seller-business via the website, as described in more detail in connection with FIG. 4A. In some embodiments, one or more buyer-businesses can request authorization to receive quotes on behalf of a particular seller-business.

As used herein, a seller-business is an entity that sells a product, whether to an end user, such as a residential purchaser, e.g., homeowner, of stone countertops, or to a reseller, e.g., a business that buys and resells products such as stone slabs. As used herein a buyer-business is an entity that buys a product and resells it to other businesses, or to an end user. A buyer-business is not limited to reselling, e.g., the buyer-business can provide services such as finishing, delivery, and installation of a product, for example. As used herein a buyer-individual is an end-user, such as a homeowner who may purchase a product such as a stone kitchen countertop.

As shown at block 205, the method embodiment of FIG. 2 includes charging a fee to the seller-business for quotes delivered to the buyer-business on behalf of the seller-business. Program instructions can execute on a server, e.g., a web server, an application server, etc. (such as shown in FIG. 1), to charge a fee to a registered seller-business when program instructions have executed to provide a quote to an authorized buyer-business on behalf of the seller-business. In some embodiments, one buyer-business can be provided with quotes from one or more seller-businesses in response to a single RFQ sent via the website by the buyer-business. In such embodiments, each seller-business can be charged a fee for the quote provided on behalf of each seller-business. Charging a fee to a seller-business for quotes is described in more detail below with respect to FIG. 3.

Figure 3:
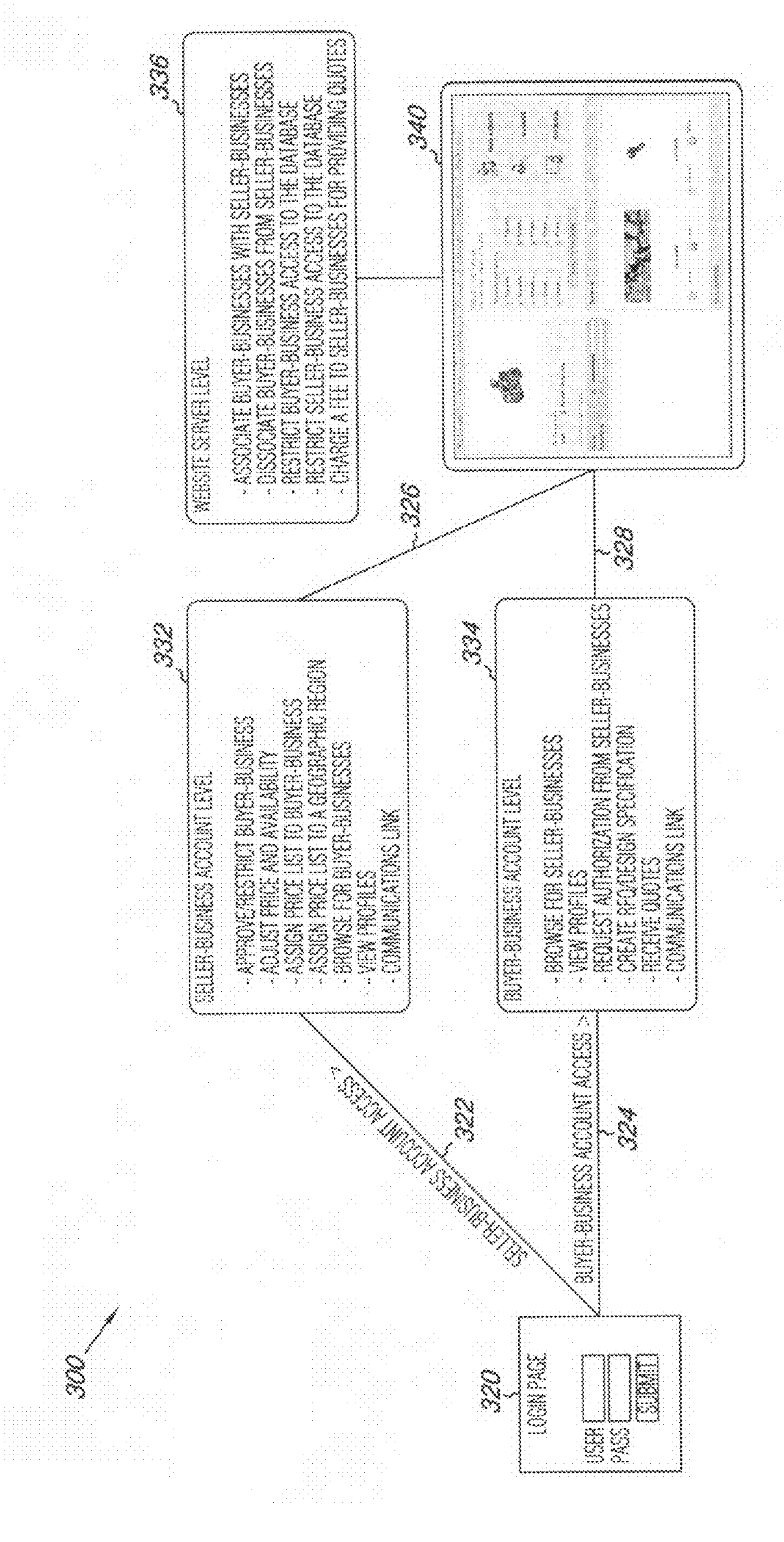
FIG. 3 illustrates a system with connectivity to accommodate one or more quotes according to one or more embodiments of the present disclosure.

FIG. 3 illustrates a system 300 with connectivity to accommodate one or more quotes according to one or more embodiments of the present disclosure. The system 300 shows access to an interface 320 for logins of various account levels. For example, the interface can be a webpage accessible over the Internet to provide login information. Embodiments, however, are not limited to a webpage for login access, e.g., a login page can be part of an organization's intranet, etc. Program instructions can execute to receive particular login information from a user via the interface 320 and provide access to another interface 340, e.g., in the form of a web page, that corresponds with the particular login information. Program instructions can execute to allow different users, e.g., a buyer-business and a seller-business, to access different interfaces 340 via login interface 320.

Various account levels can be created via an interface, such as a webpage. A user can register to create an account, for example, as a seller-business or as a buyer-business. The user can register by providing contact information, billing information, a profile, and other information pertinent to the particular market in which the user participates. For example, a seller-business can enter product price and availability information. A seller-business can also enter information such as a geographic coverage area to which the seller-business desires to provide products and/or services, e.g., stone products and/or installation. After registration, a user can be provided with login information such as a username and password for access at interface 320.

Program instructions can execute to accept logins associated with various account levels at the interface 320. In the embodiment shown in FIG. 3, program instructions execute to provide access to the interface 340 based upon input provided in association with various account levels. According to embodiments, each account level, e.g., a seller-business or a buyer-business, has various degrees of access, administration, and control. In the example embodiment of FIG. 3, two account levels and one website platform provider level are shown. However, in various embodiments, more or fewer account levels can be provided, e.g., a number of seller-business accounts, buyer-business accounts, etc.

In the FIG. 3 example embodiment, program instructions associated with the interface 340 execute in response to seller-business login information to provide account access 322 to a seller-business account level 332, as well as seller-business level access 326 to the interface 340. Program instructions associated with the interface 340 also execute in response to login information to provide buyer-business account access 324 to one or more buyer-business account levels 334 as well as buyer-business level access 328 to the interface 340. Program instructions associated with the interface 340 further execute at the website server level 336 to provide functionality and control for interface 340 to a website platform, e.g., business-to-business website platform, provider, including creating and maintaining seller-business and buyer-business accounts information and providing functionality and control associated with information provided in those account levels for interaction through one or more interfaces. Program instructions associated with the interface 340 can also execute at the website server level 336 to provide functionality and control for interface 340 to a website provider for seller-business account level 332, buyer-business account level 334, interface 320, and various accesses 322, 324, 326, and 328.

In the embodiment of FIG. 3, program instructions associated with the seller-business account level 332 can execute in response to input from a seller-business, entered via interface 340, to perform various functions. One such function is to adjust price and availability information, stored in a database associated with the website server, for a number of products offered by the seller-business. For example, a seller-business can indicate a number of products that the seller-business markets in, including options for the products, and can assign a price to the products and options. Additionally, a seller-business can create a number of price lists for the numbers of products and options such that a particular product can have different prices on different lists. For various economic reasons, as will be understood by one of ordinary skill in the art, different price lists can be assigned to different buyer-businesses, geographic regions, etc. That is, program instructions can be executed such that the website, e.g., interface 340, can receive adjustments to price and availability information from the seller-business on a per-buyer-business basis.

Another function that can be performed by executed program instructions associated with seller-business account level 332 in response to input via interface 340 is to approve or restrict a buyer-business from receiving quotes on behalf of the seller-business as described below in connection with FIG. 4A. A seller-business can approve or deny a request for authorization from a buyer-business to receive quotes via interface 340. Furthermore, a seller-business can later restrict a buyer-business from receiving quotes on behalf of the seller-business via interface 340 after having given authorization previously.

Another function is that a seller-business can browse a list of buyer-businesses that have accounts associated with interface 340. The list of buyer-businesses can include, or be linked to, a profile for one or more of the buyer-businesses. A buyer-business profile can include contact information, pictures, and statistics related to the buyer-business's use of the interface 340. Statistics for the buyer-business can include a number of quotes received, a number of quotes approved, length of time associated with the interface 340, etc. Such information can be useful to assist a seller-business in deciding whether to approve or restrict a buyer-business from receiving quotes, among other uses. Furthermore, a seller-business can unilaterally associate with a buyer-business. That is, a seller-business can decide to provide authorization to receive quotes to a buyer-business before receiving a request for authorization from the buyer-business. The buyer-business can later reject such an association, however the buyer-business is not charged for receiving quotes, and therefore may not wish to reject such an association.

Still another function can be a communications link to a buyer-business. Such a communications link can include email, text messaging, instant messaging, voice-over-IP, videoconferencing, or other web-based communications links as will be understood by one of ordinary skill in the art. The seller-business can use the communications link to facilitate acceptance of quotes, e.g., business-to-business quotes, with a buyer-business according to various embodiments of the present disclosure.

In the embodiment of FIG. 3, program instructions associated with the buyer-business account level 334 can execute in response to input from a buyer-business, entered via interface 340, to perform various functions. One such function is to request authorization from a seller-business to receive quotes on behalf of the seller-businesses. Another such function is that a buyer-business can create an RFQ and/or a design specification as described below in connection with FIG. 6A. Still another such function is that a buyer-business can browse a list of seller-businesses associated with interface 340, i.e. seller-businesses that are users of the website. The buyer-business can view profiles on or linked to the list. Profiles for seller-businesses can include contact information, pictures, and statistics related to the seller-businesses' use of the interface 340. Statistics for the seller-businesses can include a number of buyer-businesses associated with the seller business, a number of products and/or product options offered by the seller-business, among others. Statistics in the seller-businesses' profiles can also include a comparison to an average of all seller-businesses for one or more of the tracked statistics.

Another function is that a buyer-business can receive quotes on behalf of one or more seller-businesses via interface 340 as described below in connection with FIGS. 7A and 7B. Still another function can be a communications link to a seller-business. Such a communications link can include email, text messaging, instant messaging, voice-over-IP, videoconferencing, or other web-based communications links as will be understood by one of ordinary skill in the art. The buyer-business can use the communications link to facilitate acceptance of a quote provided on behalf of a seller-business.

Program instructions associated with the interface 340 execute at the website server level 336 to provide functionality and control for interface 340, seller-business account level 332, buyer-business account level 334, interface 320, and various accesses 322, 324, 326, and 328. For example, program instructions can execute to associate a buyer-business with a seller-business that accepts a request to associate from the buyer-business such that the buyer-business will receive quotes on behalf of the seller-business in response to an RFQ and/or design spec from the buyer-business. In some embodiments, program instructions can execute to dissociate a seller-business from a buyer-business by request of either the buyer-business or seller-business received via interface 340.

In one or more embodiments, program instructions can execute to restrict a buyer-business from accessing product information, e.g., price information of one or more seller-businesses, stored in a database associated with interface 340, e.g., database server 115 in FIG. 1. A buyer-business may be provided with limited product pricing and availability information that is stored in the database in the form of a quote, however, a buyer-business can not, in some embodiments, otherwise access information stored in the database. In some embodiments, program instructions can execute to restrict a seller-business from accessing product information stored in the database for other seller-businesses. That is, a seller-business can access and adjust product information pertaining to the seller-business's products, however, the seller-business can not access product information pertaining to other seller-businesses' products.

According to various embodiments, program instructions can execute to charge a fee to a seller-business for a quote delivered to a buyer business on behalf of the seller-business. The fee can be payable to a provider of the website, e.g., interface 340 in FIG. 3. For example, if a buyer-business receives a price and availability quote on behalf of three seller-businesses, as is illustrated in FIG. 7A, then each seller-business can be charged a fee for each quote having been provided on their behalf, regardless whether the buyer-business accepts any of the quotes.

Such a fee structure can be beneficial to a seller-business because, although the seller-business may be charged for quotes that do not result in sales, the seller-business can, through use of one or more embodiments of the present disclosure, reduce overhead expenses. Such overhead expenses can include the use of salespeople who may actively seek out buyer-businesses in hopes of making sales. Reduced overhead can also include staff who may manually receive RFQs and/or design specifications, process them, and prepare quotes in response. Using one or more embodiments of the present disclosure, receiving RFQs and/or design specifications, and providing quotes in response, can be performed automatically (for example, without requiring additional input from the seller-business), in real-time, using the website.

For example, some salespeople in an industry, e.g., the stone countertop industry, may receive a commission of 10% of a sale price. In the example embodiment illustrated in FIG. 7B, a salesperson, versus a website provider, can receive $222.55 (at 10% commission) for making a sale on the illustrated quote. By contrast, if a website provider charged a particular fee of, for example, $30 per quote, a seller-business can absorb at least seven quotes without a sale for every sale at the example price level provided in FIG. 7B before the seller-business would be operating at a loss compared to paying the salesperson's commission. Embodiments are not limited to the example numbers used herein. Other economic advantages are possible using one or more embodiments of the present disclosure.

An alternate fee structure can charge a fee to a seller-business for quotes provided to a buyer-business only after the seller-business takes action to approve the quote. For example, a buyer-business can create an RFQ, as described herein. Program instructions can then execute to provide a copy of a quote, e.g., quote 800-A in FIG. 8, to one or more seller-businesses, which have authorized the particular buyer-business to receive quotes. The copy of the quote can be substantially similar to a quote that would otherwise be provided directly to the buyer-business via the website as described herein. The one or more seller-businesses can then each decide whether to approve a quote to be provided to the buyer-business. The quote can be provided to the particular buyer-business, and a charge, payable to a provider of the website, can then be charged to a seller-business only after the seller-business approves the quote.

Such a fee structure can be beneficial to a seller-business in allowing the seller-business to prevent significant charges in the event that one or more authorized buyer-business flooded the seller-business with RFQs after having been authorized to receive quotes on behalf of the seller-business, thereby accruing costs for the seller-business under the previously described fee structure. In various embodiments, a seller-business can pre-screen quotes individually, in batch lots, or randomly.

The statistical information described above can be used by the seller-business, for example, to track a number of quotes provided to the particular buyer-business compared to a number of quotes accepted by the particular buyer-business. Such information can be useful to help the seller-business determine whether providing quotes to a particular buyer-business is profitable for the seller-business and whether to revoke authorization for the particular buyer-business to receive quotes on behalf of the seller-business, among other uses.

For example, tracking quotes can allow a seller-business to determine that a particular buyer-business is receiving a large number of quotes, but accepting few, if any. In such a circumstance, the seller-business may want to restrict the buyer-business from receiving future quotes because the seller-business may be charged for each quote provided to the buyer-business. Alternatively, the seller-business may want to adjust prices assigned to the buyer-business to entice the buyer-business to accept a later quote.

In another example, tracking quotes can allow a seller-business to determine that a particular buyer-business is receiving and accepting a large number of quotes. In such a circumstance, the seller-business may desire to adjust a price list associated with the particular buyer-business to maximize an economic efficiency in providing quotes to the particular buyer-business. In the same circumstance, the seller-business may wish to vertically integrate with the particular buyer-business if the seller-business determines that such a structure would redound to their benefit.

In accord with tracking quotes, as described above, some embodiments of the present disclosure provide program instructions that can be executed to provide statistical information to a seller-business, via a website interface, for one or more buyer-businesses associated with the seller-business. For example, statistical information on tracking quotes can be stored in a database, e.g., database server 115 in FIG. 1, for a particular seller-business, and can be accessed by the particular seller-business via a website provided by a web server, e.g., web server 117 in FIG. 1. As discussed above, statistical information related to tracking quotes can include, among others, information on a number of quotes provided to a buyer-business, a number of quotes accepted by the buyer-business, a gross and/or net dollar amount received from the buyer-business, and a profitability estimate for the buyer-business that can take into account a fee charged to the seller-business for each quote provided to the buyer-business. Other examples of statistical information related to tracking quotes can be employed by one of ordinary skill in the art.

Figure 4A:
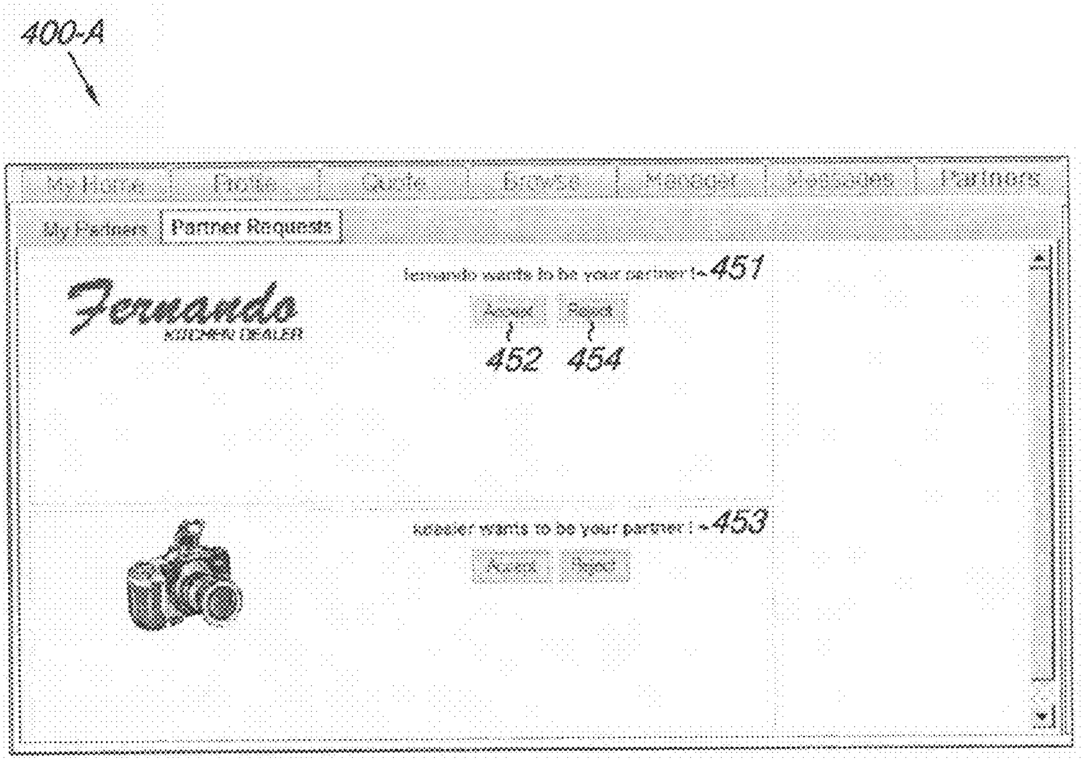
FIG. 4A illustrates an interface embodiment of seller-business control over authorizing and/or restricting buyer-business access to a quote system according to one or more embodiments the present disclosure.

FIG. 4A illustrates an interface 400-A illustrating an embodiment of a seller-business control for authorizing and/or restricting a buyer-business according to the present disclosure. Program instructions can be executed such that a website can receive, from a buyer-business, requests for authorization to receive quotes on behalf of one or more seller-businesses via a website interface. In one or more embodiments, a particular buyer-business can only receive quotes on behalf of seller-businesses that have authorized the particular buyer-business to receive quotes therefrom. In various embodiments, program instructions can be executed to provide a website interface to a buyer-business for requesting authorization to receive quotes on behalf of a seller-business and for a seller-business to selectively authorize the buyer-business to receive quotes relating to one or more products, including options and/or alternatives, associated with a project.

In the embodiment illustrated in FIG. 4A, an interface 400-A is provided to a particular seller-business. In this embodiment, the particular seller-business has received an authorization request, e.g., "partner request," 451 from a buyer-businesses "fernando" and an authorization request 453 from buyer-business "kdealer" to be authorized to receive quotes on behalf of the seller-business. The interface 400-A provides control to the seller-business to either accept 452 or reject 454 each authorization request. When the seller-business accepts 452 an authorization request from a particular buyer-business, the particular buyer-business can receive a quote, via the website, on behalf of the seller-business for future RFQs made by the particular buyer-business. As described above with respect to FIG. 3, the seller-business can, in one or more embodiments, be charged a fee for quotes provided to a buyer-business via the website. According to some embodiments, after accepting an authorization request from a particular buyer-business, a seller-business can remove the authorization through controls provided via the website interface.

Conversely, when the seller-business denies, i.e., rejects 454, an authorization request from a particular buyer-business, the particular buyer-business can not receive a quote, via the website, on behalf of the seller-business for RFQs made by the particular buyer business.

Figure 4B:
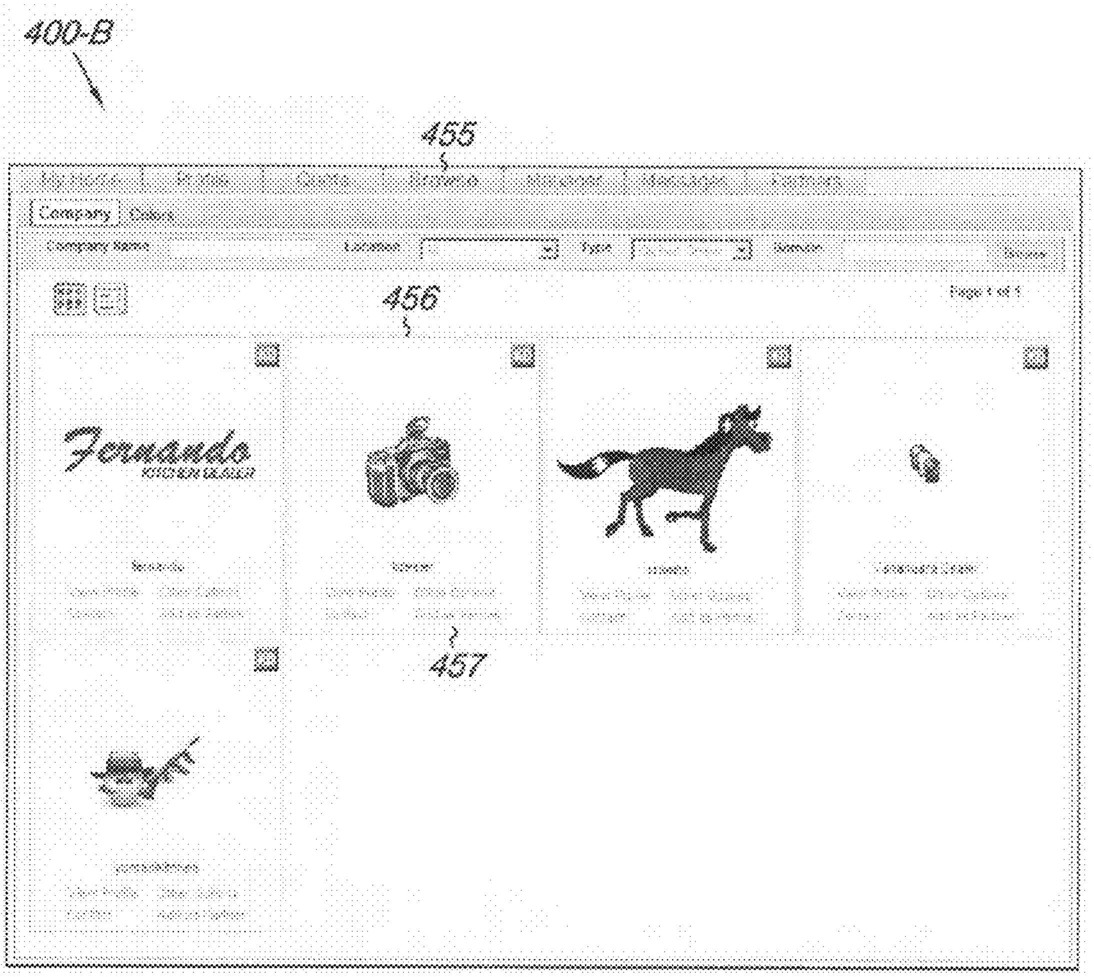
FIG. 4B illustrates an interface embodiment for a seller-business to browse a list of buyer-businesses according to one or more embodiments of the present disclosure.

FIG. 4B illustrates an interface for a seller-business to browse a list of buyer-businesses according to one or more embodiments of the present disclosure. Program instructions can be executed to provide a user, e.g., a seller-business, with an interface, such as interface 400-B, allowing the user to browse 455 a list of other users, e.g., buyer-businesses, which have accounts with the website. In the embodiment of FIG. 4B, interface 400-B is provided to a seller-business. A number of buyer-businesses are displayed including buyer-business "kdealer" 456. A seller-business can use interface 400-B to reach out to buyer-businesses, e.g., buyer-businesses that have not previously requested authorization to receive quotes via the website on behalf of the seller-business. The seller-business can use interface 400-B to view profiles of various buyer-businesses and/or add a buyer-business as a partner 457, e.g., authorize the buyer-business to receive quotes without the buyer-business requesting such authorization.

A buyer-business that receives authorization to receive quotes via the website on behalf of a seller-business can later remove such an association, i.e., authorization, via an interface provided to the buyer-business. However, as the seller-business is the entity charged by the website when quotes are provided, the buyer-business may decide not to remove such an association even if the buyer-business does not intend to purchase from the seller-business because it costs the buyer-business nothing to be associated with the seller-business.

Program instructions can execute to provide an interface, such as interface 400-B, to any user, e.g., a buyer-business or a seller-business. For example, a buyer-business can browse 455 for other buyer-businesses or for seller-businesses using the interface 400-B. A number of filter options can be available to the user, such as: displaying only buyer-businesses, displaying only seller-businesses, displaying only partners, e.g., other users that either have authorization or have granted authorization to receive quotes, displaying only users that are not partners, or displaying all users, among other options. Such filters can be useful for helping to narrow a search for prospective business associates via the interface 400-B, for example. Although program instructions can execute to provide an interface 400-B for browsing to any user, a buyer-business cannot unilaterally add a seller-business as a partner, e.g., be authorized to receive quotes via the website on behalf of the seller-business.

Figure 5:
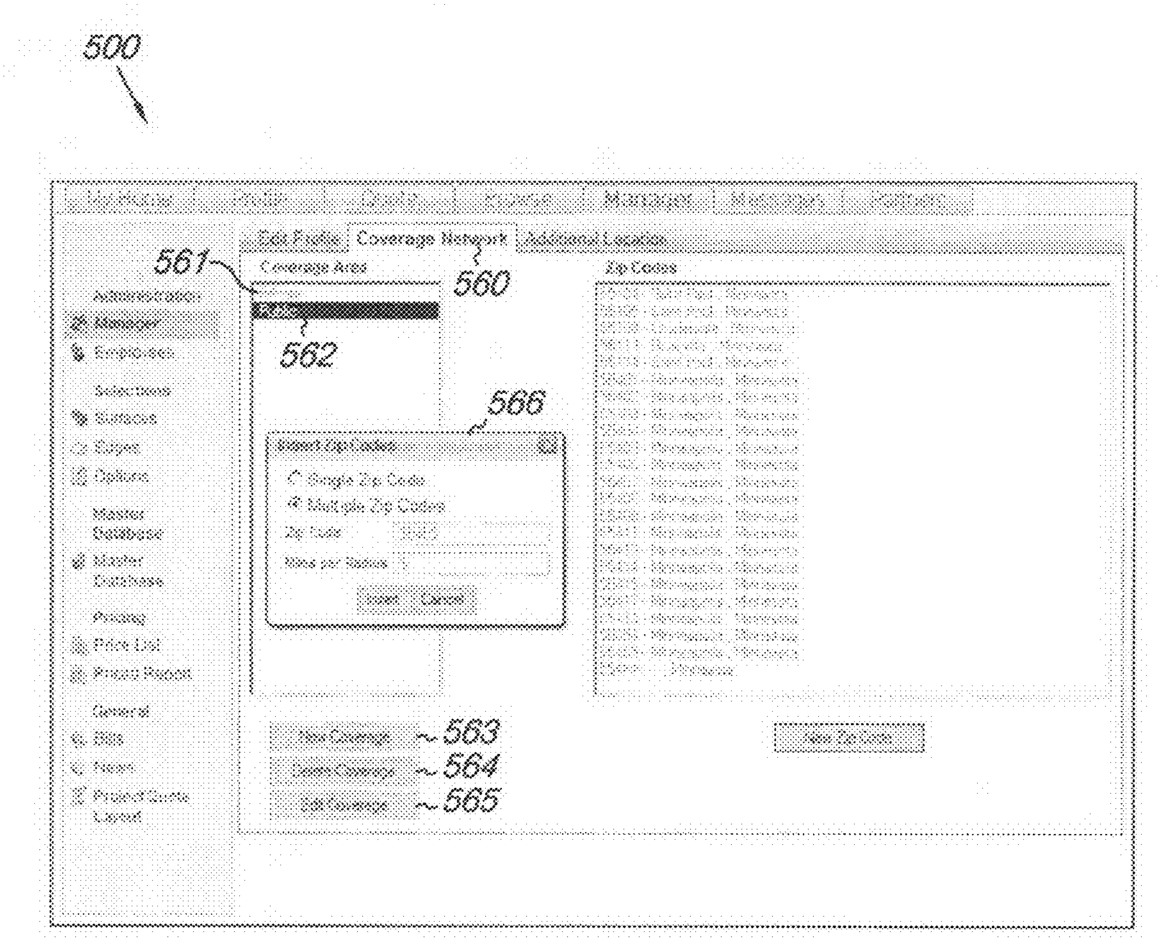
FIG. 5 illustrates an interface embodiment for a seller-business to select coverage networks according to one or more embodiments of the present disclosure.

FIG. 5 illustrates an interface 500 for a seller-business to select coverage networks according to one or more embodiments of the present disclosure. As used herein, a coverage network 560 is a market in which a seller-business desires to have quotes provided via the website. A coverage network 560 can have various embodiments as described below.

In one or more embodiments, the seller business can select a "private" coverage network 561 to define a market including buyer-individuals. The seller-business can assign a price list to the private coverage network 561. The seller-business can provide a different website hosted by a server that executes program instructions to functionally link the different website provided by the seller-business to the website described herein. Rather than providing quotes to buyer-businesses, the different website hosted by the seller-business can provide quotes to buyer-individuals using the functionality for the website described herein. Linking functionality between the websites can allow a buyer-individual to login to the seller-business provided different website and create an RFQ and/or design specification using the functionality of the website described with respect to FIGS. 6A and 6B.

The different website can display a quote on behalf of the seller-business to the buyer-individual, where the quote was processed by executed program instructions on one or more servers associated with the website that provided interface 500 to the seller-business. The quote can be provided with information from a price list created by the seller business and assigned to the private coverage network 561. Such a price list can be created and assigned based on geographic information described below, for example. In such embodiments, the seller-business can be charged a fee for the quote displayed to the buyer-individual on the different website, where the fee can be payable to a provider of the website described herein. Such a fee structure may be beneficial to the seller-business because the seller-business can be allowed to use the functionality of the website described herein and provided by the website provider.

In one or more embodiments, the seller-business can select a "public" coverage network 562 to define a market including buyer-individuals. The seller-business can assign a price list to the public coverage network 562 as a whole, based on geographic regions defined by the seller-business, or on a buyer-individual to buyer-individual basis, among other assignments of price lists.

A third party, which can also be a seller-business, can provide a different website hosted by a server that executes program instructions to functionally link the different website provided by the third party to the website described herein. Rather than providing quotes to buyer-businesses, the different website hosted by the third party can provide quotes to buyer-individuals using the functionality for the website described herein. Linking functionality between the websites can allow a buyer-individual to login to the third party provided different website and create an RFQ and/or design specification using the functionality of the website described with respect to FIGS. 6A and 6B.

The different website can display a quote on behalf of the seller-business to the buyer-individual, where the quote was processed by executed program instructions on one or more servers associated with the website that provided interface 500 to the seller-business. The quote can be provided with information from a price list created by the seller business and assigned to the public coverage network 562. In such embodiments, the seller-business can be charged a first fee for the quote displayed to the buyer-individual on the different website, where the fee can be payable to a provider of the website described herein. A second fee can be charged to the provider of the website described herein for the quote displayed to the buyer-individual on the different website, payable to the third party. Program instructions can execute such that the seller-business, via an interface provided by the website, can control whether the different website provided by the third party is authorized to provide quotes on behalf of the seller-business. Such a fee structure may be beneficial to the seller-business for reasons described above in the discussion of FIG. 3. Such a fee structure may be beneficial to the provider of the website because the provider may collect a larger fee from the seller-business yielding a net gain, among other reasons.

In embodiments where the third party is also a seller-business, program instructions can execute on one or more servers hosing the different website provided by the third party to provide control to the third party to provide quotes to the buyer-individual on behalf of only the third party when the buyer individual is located in a geographic region served by the third party. Program instructions can execute to provide quotes from other seller-businesses in other geographic regions when the buyer-individual is located in a geographic region not served by the third party.

Program instructions can execute to provide an interface such as interface 500 to a seller-business for creating new coverage networks 563, for deleting existing coverage networks 564, or editing existing coverage networks 565. For example, a seller-business can create a geographic coverage network using interface 566 to specify a zip code and a distance surrounding the zip code in which the seller-business desires to provide service. That is, the seller-business can receive a request for quotes from buyer-businesses within a geographic coverage network.

A coverage network 560 can be defined by a geographic region, e.g. a zip code, a distance from a particular point, etc. When a seller-business defines a coverage network 560 by geographic location, the seller-business indicates a region where products are available. Defining a coverage network 560 by geographic location does not imply that the seller-business is willing to allow any buyer-business in that region to receive quotes via the website on behalf of the seller-business. Requests for authorization function as described above with respect to FIG. 4A. A seller-business can assign a price list to a geographic coverage network 560 such that buyer-business in the geographic region can be provided with quotes via the website on behalf of the seller-business including information in the price list assigned to the geographic region in which the buyer-business is located.

A coverage network 560 can be defined on a buyer-business to buyer-business basis. That is, a seller-business can define which products are available to certain buyer-businesses. In conjunction with such coverage network 560 definition, a seller-business can assign one of a number of price lists to a buyer-business. Embodiments are not limited to these examples of coverage networks 560.

Figure 6A:
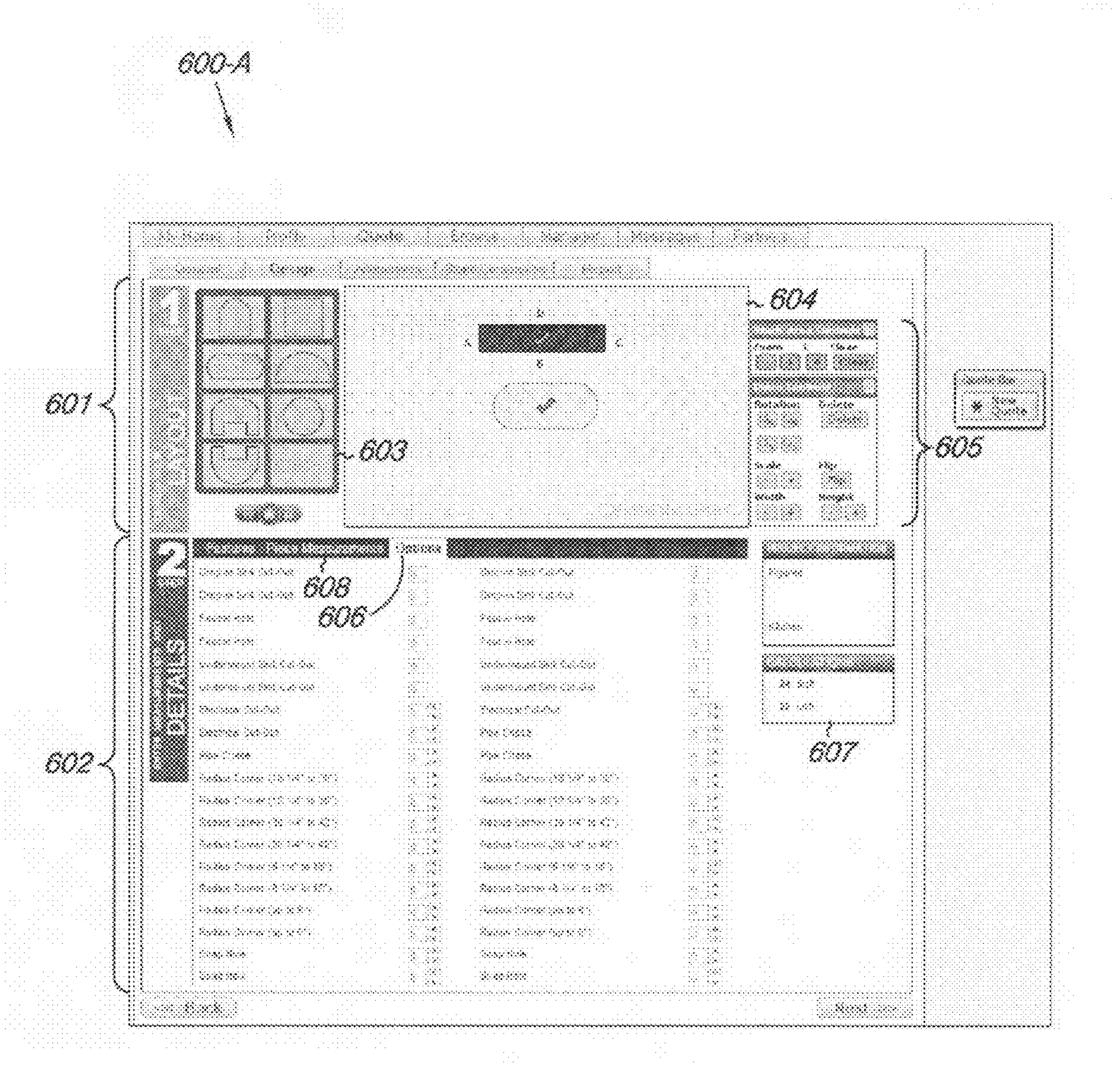
FIG. 6A illustrates an interface embodiment for a request for one or more quotes including a number of options according to one or more quote system embodiments of the present disclosure.

FIG. 6A illustrates an interface 600-A illustrating an embodiment of a request for quotes including a number of options according to the present disclosure. The interface can be provided to a buyer-business for sending an RFQ and/or creating a design specification to send with an RFQ, according to the program instructions described herein. For example, by executing program instructions according to embodiments described herein, web server 117 in FIG. 1 can provide a website with an interface, such as display interface 600-A, which can receive user input, e.g., via a keyboard, mouse, touch screen, etc., to send an RFQ and/or create a design specification from a buyer-business. The RFQ can be for a project that includes a number of products.

As used herein, a project can be the subject of a single RFQ and can include one or more products. Likewise, a single RFQ can be for only one product. As used herein, an RFQ can, but is not required to, include a design specification, where a design specification is a detailed description of one or more products, including a number of features, options, and/or layouts. For example, an RFQ can include "one widget and one sprocket" as products that are part of a project. A design specification can include "one blue widget with measurements of 6 inches×3 inches×1 inch, coupled to a red sprocket with measurements of 36 inches×3 inches×1 inch." In the example embodiment of FIG. 6A, two products are shown as part of one project. As will be described below, tab 608 can be selected by a user to enter information as part of a design specification, e.g., "piece measurements."

That is, as shown in the embodiment of FIG. 6A, program instructions can execute to display an interface 600-A, which shows a design layout section 601, a details section 602, a product selector 603, a design grid 604, a number of controls 605, an options section 606, and a piece calculations section 607. According to one or more embodiments, program instructions execute to receive particular product information from a given buyer-business and can execute to display that information in a form of graphics and/or text viewable to the authorized buyer-business and/or to one or more seller-business that receive the RFQ and/or design specification. Thus, program instructions can execute to allow the buyer-business to create a design specification including one or more products via the interface 600-A.

A user, such as a buyer-business, can interact with interface 600-A, for example, using a mouse, stylus, keyboard, touch screen, or another input device for interface 600-A. As illustrated in the embodiment of FIG. 6A, the design layout section 601 includes a product selector 603. Program instructions can execute to allow a buyer-business to select a shape of a desired product via product selector 603 in the interface 600-A. Design layout section 601 also includes a design grid 604. Program instructions can execute to allow a buyer-business to select and change a layout of products on the grid. Design layout section 601 further includes a number of controls 605. Program instructions can execute to allow a buyer-business to zoom, center, and/or clear images displayed on the design grid 604 using controls 605. Furthermore, program instructions can execute to allow a buyer business to select and rotate, scale, flip, resize, and/or delete a product from the design grid 604 using controls 605. Embodiments are not so limited.

As illustrated in the embodiment of FIG. 6A, the details section 602 includes an options section 606. Program instructions can execute to allow a buyer-business to select one or more options to include for a selected product. The details section 602 also includes a piece calculations section 607. Program instructions can execute to display a size for a number of products based on piece measurements 608. A tab for piece measurements 608 is illustrated in the embodiment of FIG. 6A, although the particular inputs associated with piece measurements tab 608 are not illustrated in FIG. 6A. Program instructions can execute to receive product measurements from a buyer-business and calculate a size of the product, e.g., an area and/or volume, among others.

As the reader will appreciate, one of ordinary skill in the art can create an interface, such as interface 600-A, with a number of components, e.g., features and/or functions, applicable to the particular market in which quotes are provided. The particular components illustrated in FIG. 6A may be useful in an interface for use with business-to-business quotes in a stone countertop market, as described above. The various components included in an interface provided to a buyer-business, such as in interface 600-A, as executed by program instructions, function to allow the buyer-business to create an RFQ and/or a design specification that can be received by the seller-business via a website providing the interface, e.g., interface 600-A or another seller interface that is a part of a web enabled system platform.

Figure 6B:
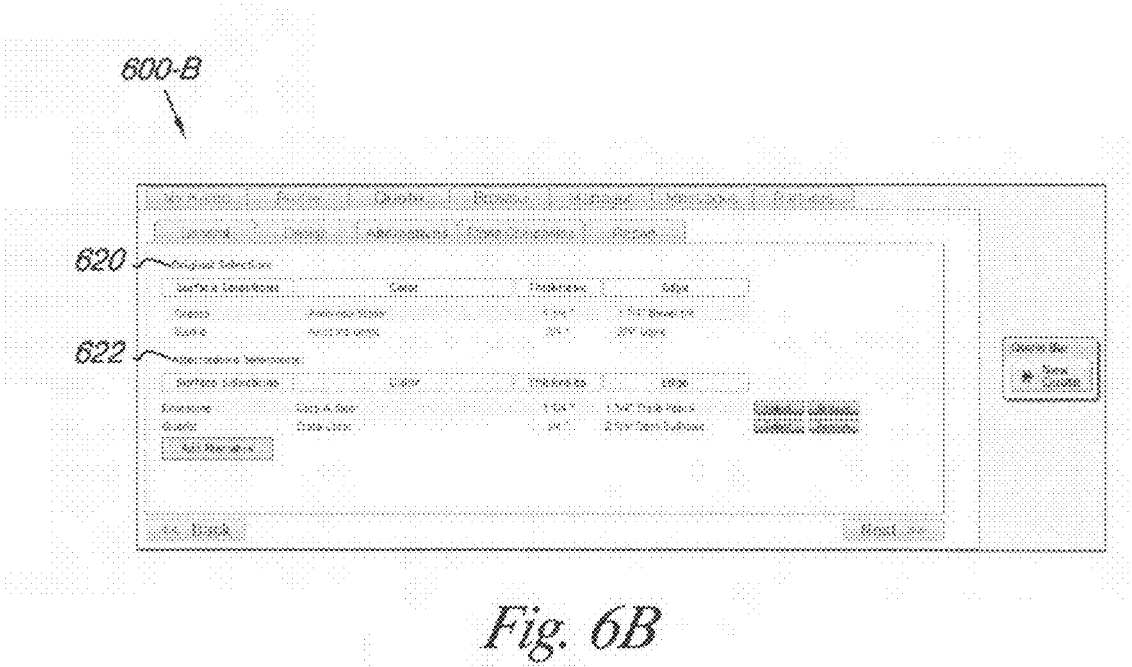
FIG. 6B illustrates an interface embodiment for a request for one or more quotes including a number of alternatives according to one or more quote system embodiments of the present disclosure.

FIG. 6B illustrates an interface 600-B illustrating an embodiment of a request for quotes including a number of alternatives according to the present disclosure. The buyer-business can access the interface 600-B for creating an RFQ for a project including a number of products and a number of alternatives for the products to be received by a seller-business via a website, according to the program instructions described herein. For example, web server 117 in FIG. 1 can host a website having a display interface, such as interface 600-B, on which a buyer-business can enter alternatives associated with one or more products in a project. The RFQ can be for a project that includes a number of products and product alternatives.

As used herein, a product option is a particular characteristic of a first particular product such as size, color, material, edging, cutouts, extra components, etc. A product alternative can be distinguished from an option as being a separate second particular product, capable of including one or more options. An RFQ can specify a number of options for a product in the RFQ in order to obtain more detailed pricing information for the buyer-business. According to embodiments of the present disclosure, the RFQ can also specify a number of alternatives in order to obtain pricing information for different products, even if the buyer-business only intends to buy one product.

For example, a first, e.g., original, product can be a stone slab. Selected options for the stone slab can include a surface area of one square foot with one inch thickness, black color, marble material, with a beveled edge. Some options 606 for stone slabs appear in the embodiment illustrated in FIG. 6A. In the event a buyer-business desired to compare a price between the first product with a similar, e.g., alternative, product of a different material, e.g., granite, the buyer-business can include an alternative product with the RFQ specifying granite as an option for material. Embodiments are not limited to the examples of options or alternatives described above.

As shown in FIG. 6B, program instructions can execute to display an interface 600-B, which shows a number of original selections 620 and alternative selections 622. Program instructions execute to receive particular product information from a given buyer-business and can execute to display that information in a form of graphics and/or text viewable to the buyer-business and/or to one or more seller-business that receive the RFQ and/or design specification. Thus, program instructions can execute to allow the buyer-business to create an RFQ and/or design specification including one or more original products and one or more alternatives via the interface 600-B.

As illustrated in the embodiment of FIG. 6B, the original and alternative products include a number of options such as surface selection, color, thickness, and edge. As described above, various embodiments are explained with respect to a business-to-business quote system for a stone countertop market. Embodiments are not so limited. One of ordinary skill in the art of website design can create an interface allowing for a buyer-business to specify a number of products with options and alternatives according to embodiments of the present disclosure.

Figure 7A:
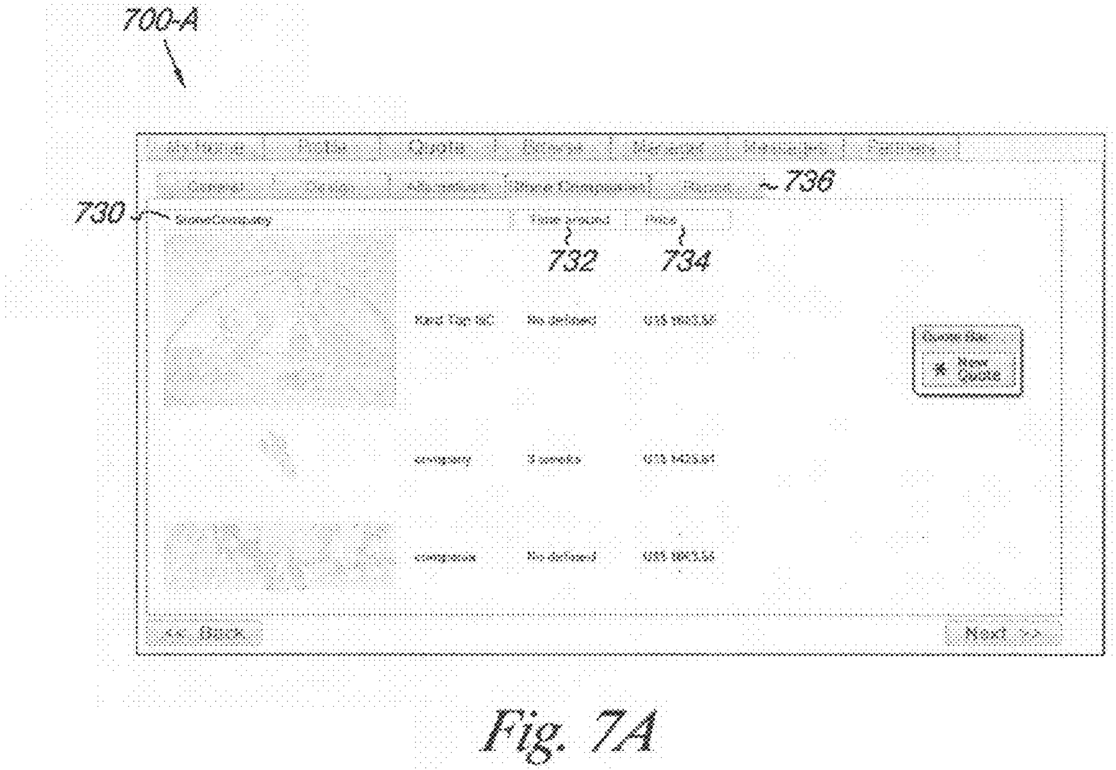
FIG. 7A illustrates an interface embodiment for a price and availability quote on behalf of a number of seller-businesses according to one or more quote system embodiments of the present disclosure.

FIG. 7A illustrates an interface 700-A illustrating an embodiment of a price and availability quote on behalf of a number of seller-businesses according to the present disclosure. The interface can be provided to a buyer-business as a quote received via a website on behalf of a number of seller-businesses that authorize a buyer-business to receive quotes according to program instructions described herein. For example, a web server, e.g., web server 117 in FIG. 1, can provide a website with an interface, such as interface 700-A, which can display a number of quotes on behalf of a number of seller-businesses. The interface 700-A can provide one reference for a buyer-business to compare a number of quotes, e.g., prices, for a single, previously submitted, RFQ.

As shown in FIG. 7A, program instructions can execute to display an interface 700-A, which shows a number of seller-businesses 730, e.g., stone companies, a turn around time 732 for completion of the project associated with the quote for each seller-business, and a price 734 associated with the quote for each seller-business. A turn around time can include an estimated time of delivery of a project, installation of a project, or another completion time as will be understood by one of ordinary skill in the art. Program embodiments are provided such that instructions can execute to receive an RFQ via a website from a buyer-business including one or more products as described above.

In response to the RFQ, program instructions can be executed to query a database, e.g., database server 115 in FIG. 1, that stores product information, e.g., in a number of price lists, for a number of seller-businesses 730. The database can be queried for product information stored for a number of seller-businesses 730 that have authorized the buyer-business to receive quotes. Such product information can include price and availability information, both of which can be adjusted by a seller-business on a per-buyer-business basis, for example. That is, a seller-business can adjust price and availability information in one or more price lists. The seller-business can assign one price list to one or more buyer-businesses, and can assign different price lists to different buyer-businesses.

Using the product information from the database, a price 734 and availability estimate, e.g., turn around time 732, can be generated for the quote. Program instructions can be executed to provide the buyer-business with a quote including a price 734 and turn around time 732 quote on behalf of each associated seller-business 730. In some instances, a particular seller-business, though associated with the buyer-business, may not stock a particular product included in the RFQ. In such instances, a quote may not be provided on behalf of the particular seller-business. Also, as illustrated in FIG. 7A, a seller-business may not include availability information for a particular product. When, in some embodiments, availability information is not provided by a seller-business for a particular product, a turn around time is not included with the quote on behalf of the seller-business, e.g., there is “no defined” turn around time.

The number of quotes displayed in interface 700-A, e.g., interface 340 in FIG. 3 provided to a buyer-business, reflect a seller-business 730, a turn around time 732, and a price 734 for the RFQ and/or design specification. Program instructions can be executed to provide a more detailed quote, e.g., including information specific to each product in the RFQ and/or design specification, to the buyer-business using the report tab 736, as will be described below with respect to FIG. 7B.

Figure 7B:
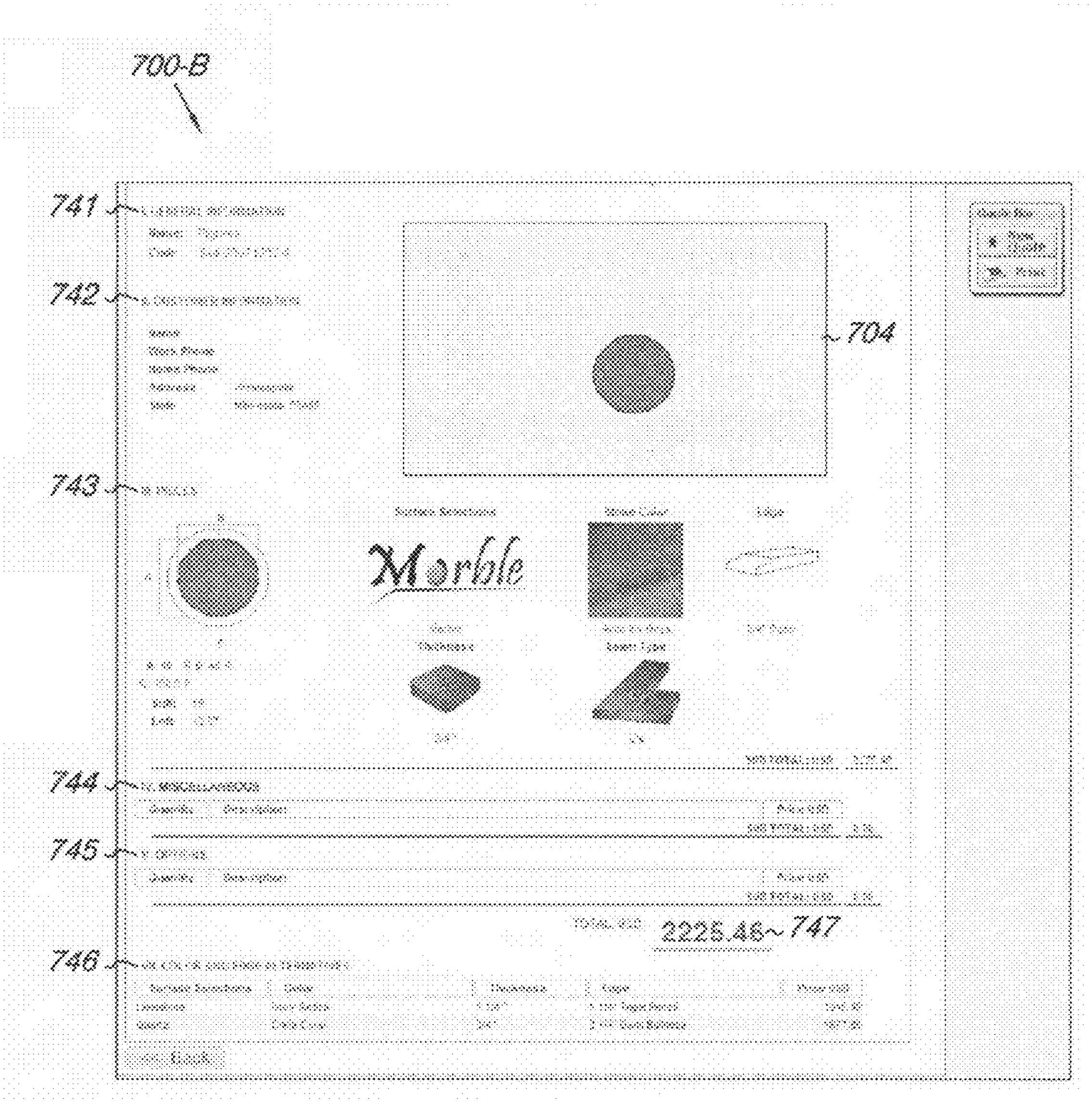
FIG. 7B illustrates an embodiment of a quote according to one or more embodiments of the present disclosure.

FIG. 7B illustrates an embodiment of a quote 700-B according to the present disclosure. The quote can be provided to a buyer-business as a quote received via a website on behalf of a seller-business that authorizes the buyer-business to receive quotes according to program instructions described herein. For example, web server 117 in FIG. 1 can provide a website that displays a quote, such as business-to-business quote 700-B, to a buyer-business in response to an RFQ received from the buyer-business.

For example, after a buyer business enters an RFQ and/or design specification, program instructions can execute such that a buyer-business can view a number of quotes on behalf of a number of seller-businesses, as illustrated in FIG. 7A. The buyer-business can select one of the seller-businesses that provided a quote, e.g., a quote from FIG. 7A, and program instructions can be executed to provide a more detailed quote to the buyer-business, e.g., a quote from FIG. 7B. Furthermore, program instructions can be executed such that a copy of the quote is viewable by a seller-business. For example, program instructions can be executed such that a seller-business can be notified that a quote has been provided to the buyer-business, via the website, on behalf of the seller-business. Such notification can be in the form of email, text message, a pop-up window provided by instructions executed to display on the seller-businesses interface, a message provided to the seller-business upon login to the website, etc. Embodiments are not so limited.

The quote 700-B can provide information to the buyer-business including: general information 741, customer information 742, product information 743, miscellaneous information 744, options information 745, alternatives information 746, and a price 747. Embodiments are not limited to these examples. A seller-business can customize the content of detailed information in the quote 700-B to include more or fewer components than are illustrated in FIG. 7B.

Program embodiments are provided such that instructions execute to display general information 741 for the quote including an RFQ and/or design specification title assignable by a buyer-business. A title for an RFQ and/or design specification can be useful to the buyer-business for tracking various RFQs and/or design specifications. For example, a particular buyer-business can have a number of projects and/or serve a number of customers. The particular buyer-business can make one or more RFQs for the number of projects and/or customers. Assigning a title to each RFQ can help the buyer-business associate received quotes with a particular project and/or customer. General information can also include an identification code assignable by executed program instructions. An identification code can be useful for recordkeeping as well as for various fee charging features as described above in connection with FIG. 3.

In some embodiments, program instructions can execute to display customer information 742 for the buyer-business including contact information such as names, phone numbers, and addresses of individuals or entities associated with the buyer-business, etc. In one or more embodiments, the customer information 742 can include information for a customer of the buyer-business, e.g., an end user of products included in an RFQ and/or quote. In various embodiments, a particular seller-business may not be able to view the customer information 742 until a buyer-business accepts a quote, e.g., forms a purchase contract with the particular seller-business. Such embodiments can be beneficial to a buyer-business to provide some assurance that a seller-business would not end-run the buyer-business by selling directly to a customer of the buyer-business, e.g., and end user. However, providing customer information 742 to a seller-business after a quote has been accepted can be beneficial to all parties involved by allowing the seller-business to contact the customer of the buyer-business directly to clarify any issues that may not be covered in full by the RFQ and/or quote.

Program instructions can execute to display product, e.g., piece, information 743 received from the RFQ and/or design specification. Product information 743 can include various text and/or graphics descriptions of the product such as surface, color, edge, thickness, seam type, etc. Displaying product information on the quote can be useful to both the buyer-business and seller-business, as each can receive a copy of the quote. The buyer-business can use the information to verify correct entry of desired products. The seller-business can use the information to quickly and accurately fill the order when the buyer-business accepts the quote. Although the embodiment of FIG. 7B illustrates product information for stone products, one of ordinary skill in the art can provide program instructions executable to display product information 743 useful and pertaining to products in other business-to-business quote markets. Embodiments are not limited to the stone countertop market.

Program instructions can execute to display miscellaneous information 744 received from the RFQ and/or design specification. Miscellaneous information 744 can include directions and/or costs associated with miscellaneous details of a transaction such as shipping, handling, installation, etc. For example, program instructions can be executed such that a distance from a seller-business to a buyer-business can be determined from an address in customer information 742 for the buyer-business and an address stored in a seller-business's profile. Such program instructions for calculating distance can include mapping software provided by a third party. Program instructions can be executed to calculate a transportation charge based on the distance and shipping fee information that can be stored in a database, e.g., database server 115 in FIG. 1, by the seller-business.

Program instructions can execute to display options information 745 received from the RFQ and/or design specification. Options information 745 can include options not already displayed with product information 743. Certain options may be so closely related to the product itself that the options are more logically included in the product information 743. With respect to stone countertops, such closely related options can include surface, color, edge, thickness, and seam type. However, including all possible options with the product information 743 can clutter the display and/or lead to confusion. Thus, various options can be separately included with the options information 745. Examples of such options appear in options section 606 of FIG. 6A. Options information 745 can include a description of various options as well as a price associated with one or more options. Program instructions can be executed to display the price associated with one or more options after querying a database, e.g., database server 115 in FIG. 1, which stores product information for the seller-business.

Program instructions can execute to display alternatives information 746 received from the RFQ and/or design specification. Alternatives information 746 can include a number of alternate selections made by the buyer-business in the RFQ and/or design specification as described above with respect to FIG. 6B. Alternatives information 746 can include a description of closely related options selected with the alternatives, as well as a price associated with each alternative. As with options information, the price for each alternative can be retrieved from a database by executed program instructions. Displaying a price for each alternative can be useful in allowing the buyer-business to compare one or more alternative quotes received in response to a single RFQ.

Program instructions can execute to display a price 747 for the project, inclusive of selected products and options. Program instructions can be executed to calculate the price 747 based on the products and options selected by the buyer-business in the RFQ and/or design specification using product information stored for the seller-business in a database. Product price information can be stored in the database such that a price for a product is stored on a per-unit basis. For certain products, a per-unit basis can be a price for one product, e.g., price for one widget. For other products, a per-unit basis may be a price per measurement unit, e.g., price per foot, per pound, etc. Embodiments are not so limited.

Figure 8A:
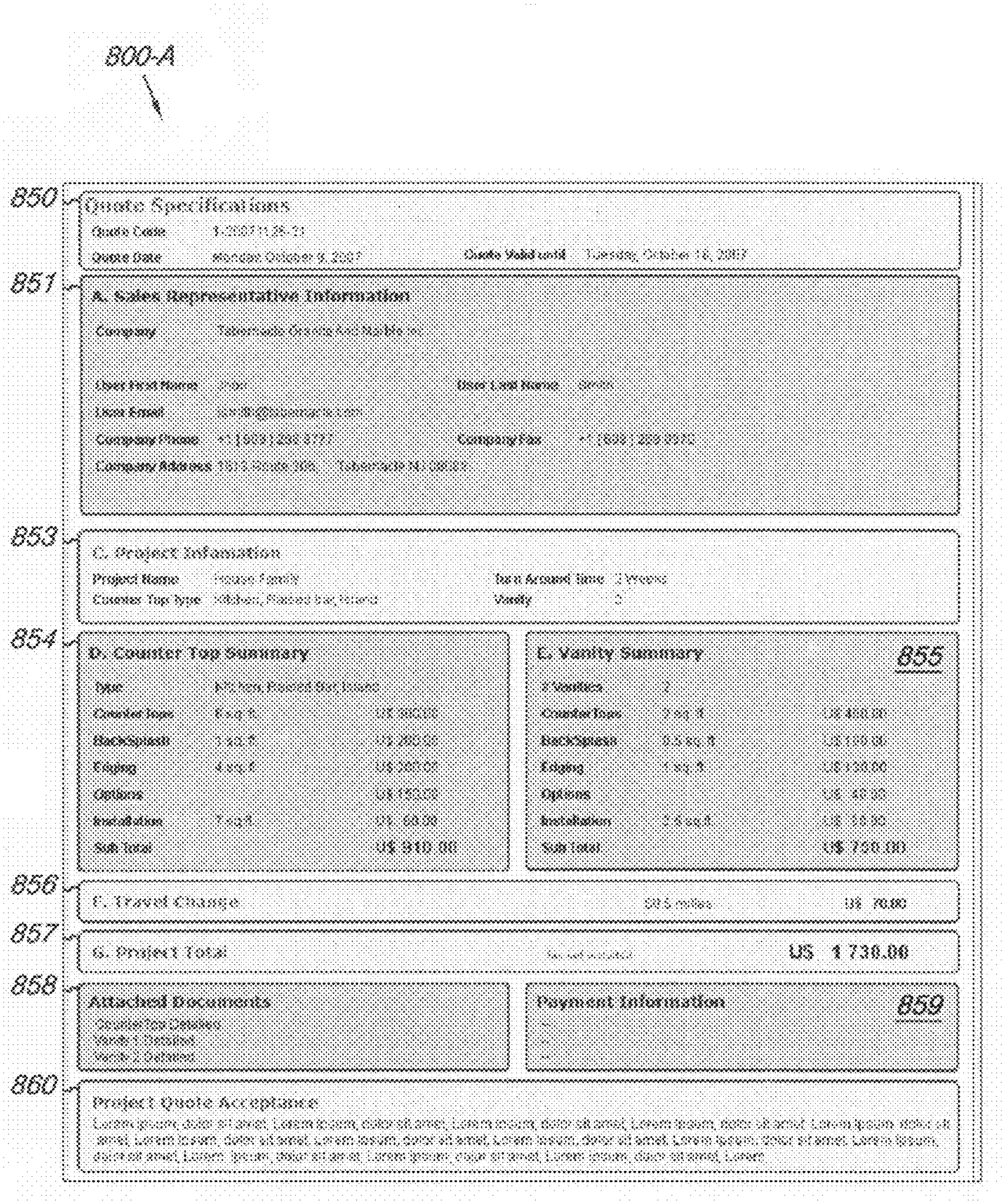
FIG. 8A illustrates an embodiment of a copy of a quote displayable to a seller-business prior to acceptance of the quote by a buyer-business according to one or more embodiments of the present disclosure.
Figure 8B:
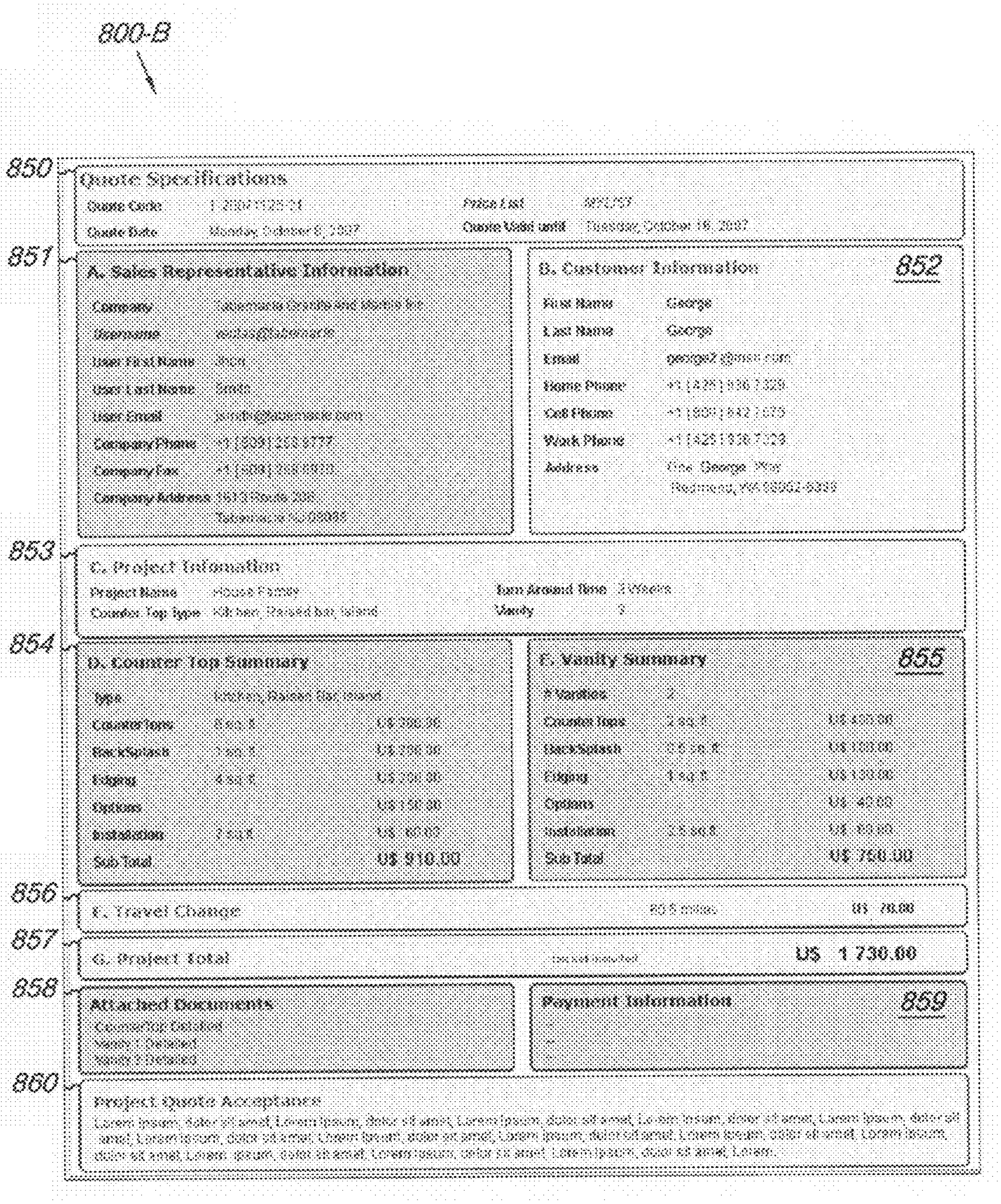
FIG. 8B illustrates an embodiment of a copy of a quote displayable to a seller-business after acceptance of the quote by a buyer-business according to one or more embodiments of the present disclosure.

FIG. 8A illustrates an embodiment of a copy of a quote 800-A displayable to a seller-business prior to acceptance of the quote by a buyer-business according to one or more embodiments of the present disclosure. As described above, quotes may be generated by one or more servers that host a website and may be provided to a buyer-business on behalf of one or more seller-businesses, as shown in FIGS. 7A and 7B. Copies of quotes may also be provided to the one or more seller-businesses as shown in FIGS. 8A and 8B. In one or more embodiments, a copy of a quote provided to a seller-business before a buyer-business accepts the quote, e.g., quote 800-A, may take a different form than a copy of a quote provided to a seller-business after a buyer-business accepts the quote, e.g., quote 800-B in FIG. 8B. Such embodiments can be used to help prevent a seller-business from accessing certain information prior to closing a deal with a buyer-business, e.g., forming a purchase contract.

Quote 800-A can include quote specifications 850, which can include the same or different information as general information 741 in quote 700-B in FIG. 7B. For example, quote specifications 850 can include a quote identification code, date, and valid-until date. A valid-until date can be useful for indicating to a buyer-business and/or seller-business, a date after which the validity of the quote expires.

Quote 800-A can also include sales representative information 851, project information 853, summaries 854 and 855, a travel charge 856, project total 857, attached documents list 858, payment information 859, and terms of project quote acceptance 860. As the reader will appreciate, a quote 800-A is merely an example embodiment of a quote. A quote can include more or less features than appear in FIG. 8A. One of ordinary skill in the art will appreciate the information which can be contained in a quote for a particular market. The quote illustrated in FIG. 8A may contain example information that can be used in a kitchen countertop market. Embodiments are not so limited.

With respect to the embodiment of a quote illustrated in FIG. 8A, a travel charge 856 can include a cost for shipping and/or delivery of products included in a project specified by an RFQ. As described above, program instructions can execute to calculate a delivery distance using mapping software and information entered by the seller-business and buyer-business. For example, a seller-business can include information in one or more price lists relating to a delivery charge. Such a delivery charge can be specified as a flat fee, as a rate per distance, as a flat fee plus a rate per distance, or other fees.

Quote 800-A can be displayable via an interface created by executed program instructions, to a seller-business after a quote is provided to a buyer-business on behalf of the seller-business via the website. Quote 800-A does not include customer information 852, as illustrated in FIG. 8B. As described above, withholding customer information 852, e.g., end-user information, from a seller-business can help prevent a seller-business from using quotes provided via the website as leads to sell to end-users without dealing with a buyer-business that may have worked to acquire the lead, e.g., customer.

In one or more embodiments, after a buyer-business submits an RFQ via the website, a copy of a quote, such as quote 800-A, can be provided to a seller-business via the website before a quote, such as quote 700-B, is provided to a buyer-business via the website. In such embodiments, the seller-business can receive a copy of a quote, e.g., quote 800-A, and take action to approve the quote, e.g., via one or more inputs to a website interface, such as an interface associated with seller-business account level 332 in FIG. 3. According to such embodiments, if the seller-business does not approve the quote, then a corresponding quote would not be sent to the buyer-business via the website. However, if the seller-business approved the quote, the buyer-business would receive a corresponding quote via the website on behalf of the seller-business. Such embodiments may be useful with fee structures that charge a seller-business after the seller-business approves a quote.

FIG. 8B illustrates an embodiment of a copy of a quote 800-B displayable to a seller-business after acceptance of the quote by a buyer-business according to one or more embodiments of the present disclosure. Quote 800-B may contain information substantially similar to that contained in quote 800-A, illustrated in FIG. 8A. The reader will appreciate that quote 800-B further contains customer information 852. As described above, after a buyer-business approves, e.g., selects a quote, program instructions can execute to display quote 800-B, including customer information 852, to a seller-business via an interface to the website.

Although specific embodiments have been illustrated and described herein, those of ordinary skill in the art will appreciate that an arrangement calculated to achieve the same techniques can be substituted for the specific embodiments shown. This disclosure is intended to cover all adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that embodiments of the present disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:

providing a first website of a first provider to display quotes to a buyer-business from a seller-business in response to requests for quotes received from the buyer-business;

receiving a request from the buyer-business for authorization for the buyer-business to receive quotes from the seller-business;

authorizing the buyer-business to receive quotes from the seller-business in response to a request from the seller-business approving the request for authorization;

creating price lists including a first price list assigned to the buyer-business and a second price list assigned to a geographic region;

linking functionality of the first website of the first provider to a second website of a second provider;

receiving a request for quotes through the second website from a buyer-individual;

creating, in response to the request for quotes received through the second website, a quote for the buyer-individual based at least in part on the second price list assigned to the geographic region;

displaying, via the second website, the quote to the buyer-individual;

charging, to the seller-business, a first fee payable to the first provider for the quote displayed to the buyer-individual; and charging, to the first provider, a second fee payable to the second provider for the quote displayed to the buyer-individual;

wherein the abovementioned steps are performed using a computer processor.

2. The method of claim 1, wherein the method includes:

receiving a request for quotes through the first website from a buyer-business;

creating, in response to the request for quotes received through the first website, a quote for the buyer-business based at least in part on the first price list assigned to the buyer-business;

displaying, via the first website, the quote to the buyer-business; and charging, to the seller-business, a fee payable to the first provider for the quote displayed to the buyer-business.

3. The method of claim 2, wherein the method includes:

storing the price lists in a database associated with the first website;

receiving adjustments via the first website, from the seller-business, to the price lists;

creating, in response to a subsequent request for quotes received through the first website, a subsequent quote for the buyer-business based at least in part on an adjusted first price list assigned to the buyer-business; and displaying, via the first website, the subsequent quote to the buyer-business.

4. The method of claim 3, wherein creating price lists includes entering price and availability information, by the seller-business.

5. The method of claim 3, wherein receiving adjustments includes receiving adjustments via the first website, from the seller-business, to the price lists on a per buyer-business basis.

6. The method of claim 3, wherein storing the price lists in a database includes restricting other seller-businesses from accessing the price lists.

7. The method of claim 1, wherein the method includes:

receiving a request from the buyer-business for authorization for the buyer-business to receive quotes from a plurality of seller-businesses;

authorizing the buyer-business to receive quotes from those of the plurality seller-businesses in response to a request from those of the plurality of seller-businesses approving the request for authorization;

receiving a request for quotes through the first website from a buyer- business;

creating, in response to the request for quotes received through the first website, quotes for the buyer-business on behalf of those of the plurality of seller-businesses approving the request for authorization;

displaying, via the first website, quotes to the buyer-business from those of the plurality of seller-businesses approving the request for authorization; and charging, to those of the seller-businesses approving the request for authorization, a fee payable to the first provider for the quotes displayed to the buyer-business.

8. The method of claim 1, wherein displaying the quote includes:

displaying a price and a turn-around time for completion of a project; and displaying a price for each of a number of products included in the project.

9. The method of claim 8, wherein displaying a price for each of a number of products includes displaying a price for a number of alternative products for the number of products.

10. The method of claim 1 wherein the method includes:

receiving a request from the seller-business, via the first website, to restrict the buyer-business from receiving quotes from the seller-business; and revoking authorization of the buyer-business to receive quotes from the seller-business in response to the request from the seller-business to restrict the buyer-business from receiving quotes.

11. A non-transitory computer readable medium having executable instructions stored thereon, wherein the instructions cause a computer processor to perform the following steps:

providing a first website of a first provider to display quotes to a buyer-business from a seller-business in response to requests for quotes received from the buyer-business;

receiving a request from the buyer-business for authorization for the buyer-business to receive quotes from the seller-business;

authorizing the buyer-business to receive quotes from the seller-business in response to a request from the seller-business approving the request for authorization;

creating price lists including a first price list assigned to the buyer-business and a second price list assigned to a geographic region;

linking functionality of the first website of the first provider to a second website of a second provider;

receiving a request for quotes through the second website from a buyer-individual;

creating, in response to the request for quotes received through the second website, a quote for the buyer-individual based at least in part on the second price list assigned to the geographic region;

displaying, via the second website, the quote to the buyer-individual;

charging, to the seller-business, a first fee payable to the first provider for the quote displayed to the buyer-individual; and charging, to the first provider, a second fee payable to the second provider for the quote displayed to the buyer-individual.

12. The medium of claim 11, wherein the instructions cause the computer processor to perform additional steps including:

receiving a request for quotes through the first website from a buyer-business;

creating, in response to the request for quotes received through the first website, a quote for the buyer-business based at least in part on the first price list assigned to the buyer-business;

displaying, via the first website, the quote to the buyer-business; and charging, to the seller-business, a fee payable to the first provider for the quote displayed to the buyer-business.

13. The medium of claim 11, wherein the instructions cause the computer processor to perform additional steps including:

creating additional price lists for a second seller-business;

restricting the buyer-business from access to the price lists and the additional price lists; and restricting the seller-business from access to the additional price lists.

14. The medium of claim 11, wherein the instructions cause the computer processor to perform additional steps including:

receiving a request from the buyer-business for authorization for the buyer-business to receive quotes from a plurality of seller-businesses;

authorizing the buyer-business to receive quotes from those of the plurality seller-businesses in response to a request from those of the plurality of seller-businesses approving the request for authorization;

receiving a request for quotes through the first website from a buyer-business;

creating, in response to the request for quotes received through the first website, quotes for the buyer-business on behalf of those of the plurality of seller-businesses approving the request for authorization;

displaying, via the first website, quotes to the buyer-business from those of the plurality of seller-businesses approving the request for authorization; and charging, to those of the seller-businesses approving the request for authorization, a fee payable to the first provider for the quotes displayed to the buyer-business.

15. A system comprising:

a computer processor; and a memory, connected to the computer processor, the memory storing executable instructions which cause the computer processor to:

provide a first website of a first provider to display quotes to a buyer-business from a seller-business in response to requests for quotes received from the buyer-business;

receive a request from the buyer-business for authorization for the buyer-business to receive quotes from the seller-business;

authorize the buyer-business to receive quotes from the seller-business in response to a request from the seller-business approving the request for authorization;

create price lists including a first price list assigned to the buyer-business and a second price list assigned to a geographic region;

link functionality of the first website of the first provider to a second website of a second provider;

receive a request for quotes through the second website from a buyer-individual;

create, in response to the request for quotes received through the second website, a quote for the buyer-individual based at least in part on the second price list assigned to the geographic region;

display, via the second website, the quote to the buyer-individual;

charge, to the seller-business, a first fee payable to the first provider for the quote displayed to the buyer-individual; and charge, to the first provider, a second fee payable to the second provider for the quote displayed to the buyer-individual.

16. The system of claim 15, wherein the instructions further cause the computer processor to:

receive a request for quotes through the first website from a buyer-business;

create, in response to the request for quotes received through the first website, a quote for the buyer-business based at least in part on the first price list assigned to the buyer-business;

display, via the first website, the quote to the buyer-business; and charge, to the seller-business, a fee payable to the first provider for the quote displayed to the buyer-business.

17. The system of claim 16, wherein the instructions further cause the computer processor to:

display statistics to the seller-business via the first website related to use of the first website by the buyer-business, where statistics are selected from the group including:

a number of quotes received by the buyer-business;

a number of quotes accepted by the buyer-business; and length of time the buyer-business has been associated with the system; and display statistics to the buyer-business via the first website related to use of the first website by the seller-business, where statistics are selected from the group including:

a number of buyer-businesses authorized to receive quotes from the seller-business;

a number of products offered by the seller-business; and a number of product options offered by the seller-business.

18. The system of claim 15, wherein the instructions further cause the computer processor to:

receive a request from the buyer-business for authorization for the buyer-business to receive quotes from a plurality of seller-businesses;

authorize the buyer-business to receive quotes from those of the plurality seller-businesses in response to a request from those of the plurality of seller-businesses approving the request for authorization;

receive a request for quotes through the first website from a buyer-business;

create, in response to the request for quotes received through the first website, quotes for the buyer-business on behalf of those of the plurality of seller-businesses approving the request for authorization;

display, via the first website, quotes to the buyer-business from those of the plurality of seller-businesses approving the request for authorization; and charge, to those of the seller-businesses approving the request for authorization, a fee payable to the first provider for the quotes displayed to the buyer-business.

19. The system of claim 18, wherein the instructions further cause the computer processor to display a list of the plurality of seller-business to the buyer-business upon receiving a request from the buyer-business to view the list of the plurality of seller-businesses.

20. The system of claim 15, wherein the instructions further cause the computer processor to provide a communication link between the first and second websites for facilitating acceptance of the quote, where the communication link is one selected from the group including: email, text messaging, instant messaging, voice-over-IP, and video conferencing.

* * * * *